US008831928B2

(12) United States Patent
Marcu et al.

(10) Patent No.: US 8,831,928 B2
(45) Date of Patent: Sep. 9, 2014

(54) CUSTOMIZABLE MACHINE TRANSLATION SERVICE

(75) Inventors: Daniel Marcu, Hermosa Beach, CA (US); William Wong, Huntington Beach, CA (US); Felix Lung, Los Angeles, CA (US)

(73) Assignee: Language Weaver, Inc., Los Angeles, CA (US)

( * ) Notice: Subject to any disclaimer, the term of this patent is extended or adjusted under 35 U.S.C. 154(b) by 840 days.

(21) Appl. No.: 11/784,161

(22) Filed: Apr. 4, 2007

(65) Prior Publication Data

US 2008/0249760 A1    Oct. 9, 2008

(51) Int. Cl.
G06F 17/28    (2006.01)
G06F 17/20    (2006.01)

(52) U.S. Cl.
USPC ............... 704/2; 701/1; 701/3; 701/4; 701/5; 701/6; 701/7

(58) Field of Classification Search
USPC ....................................................... 704/1–10
See application file for complete search history.

(56) References Cited

U.S. PATENT DOCUMENTS

| 4,502,128 | A |   | 2/1985  | Okajima et al. |
|-----------|---|---|---------|----------------|
| 4,599,691 | A |   | 7/1986  | Sakaki et al.  |
| 4,615,002 | A |   | 9/1986  | Innes          |
| 4,661,924 | A |   | 4/1987  | Okamoto et al. |
| 4,787,038 | A |   | 11/1988 | Doi et al.     |
| 4,791,587 | A |   | 12/1988 | Doi            |
| 4,800,522 | A |   | 1/1989  | Miyao et al.   |
| 4,814,987 | A |   | 3/1989  | Miyao et al.   |
| 4,942,526 | A |   | 7/1990  | Okajima et al. |
| 4,980,829 | A | * | 12/1990 | Okajima et al. ............... 704/5 |
| 5,020,112 | A |   | 5/1991  | Chou           |
| 5,088,038 | A |   | 2/1992  | Tanaka et al.  |
| 5,091,876 | A |   | 2/1992  | Kumano et al.  |
| 5,146,405 | A |   | 9/1992  | Church         |

(Continued)

FOREIGN PATENT DOCUMENTS

DE   202005022113.9   2/2014
EP      0469884       2/1992

(Continued)

OTHER PUBLICATIONS

Knight, K. and Chander, I., "Automated Postediting of Documents,"1994, Proc. of the 12th Conference on Artificial Intelligence, pp. 779-784.

(Continued)

*Primary Examiner* — Douglas Godbold
*Assistant Examiner* — Michael Ortiz Sanchez
(74) *Attorney, Agent, or Firm* — Carr & Ferrell LLP

(57) ABSTRACT

Embodiments of the present invention provide a system and method for providing a translation service. The method comprises providing a translation interface accessible via a network. The translation interface receives specialized data associated with a domain from a member. A text string written in a source language is received from the member via the translation interface. A domain-based translation engine is selected. The domain-based translation engine may be associated with a source language, a target language, and a domain. The text string is translated into the target language using, at least in part, the selected domain-based translation engine. The translated text string is transmitted to the member via the Internet. In some embodiments, a translation memory is generated based on the specialized data.

23 Claims, 6 Drawing Sheets

(56) References Cited

U.S. PATENT DOCUMENTS

| | | |
|---|---|---|
| 5,167,504 A | 12/1992 | Mann |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |
| 5,302,132 A | 4/1994 | Corder |
| 5,311,429 A | 5/1994 | Tominaga |
| 5,387,104 A | 2/1995 | Corder |
| 5,408,410 A | 4/1995 | Kaji |
| 5,432,948 A | 7/1995 | Davis et al. |
| 5,442,546 A * | 8/1995 | Kaji et al. ............ 704/4 |
| 5,477,450 A * | 12/1995 | Takeda et al. ............ 704/2 |
| 5,477,451 A | 12/1995 | Brown et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A * | 7/1996 | Chong et al. ............ 704/3 |
| 5,541,836 A | 7/1996 | Church et al. |
| 5,541,837 A | 7/1996 | Fushimoto |
| 5,548,508 A | 8/1996 | Nagami |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,893,134 A | 4/1999 | O'Donoghue et al. |
| 5,903,858 A | 5/1999 | Saraki |
| 5,907,821 A | 5/1999 | Kaji et al. |
| 5,909,681 A | 6/1999 | Passera et al. |
| 5,930,746 A | 7/1999 | Ting |
| 5,966,685 A | 10/1999 | Flanagan et al. |
| 5,966,686 A | 10/1999 | Heidorn et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,047,252 A | 4/2000 | Kumano et al. |
| 6,064,819 A | 5/2000 | Franssen et al. |
| 6,064,951 A * | 5/2000 | Park et al. ............ 704/8 |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,119,078 A | 9/2000 | Kobayakawa et al. |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,205,456 B1 | 3/2001 | Nakao |
| 6,206,700 B1 | 3/2001 | Brown et al. |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 * | 8/2001 | King et al. ............ 704/7 |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,473,896 B1 | 10/2002 | Hicken et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,604,101 B1 | 8/2003 | Chan et al. |
| 6,609,087 B1 | 8/2003 | Miller et al. |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,745,176 B2 | 6/2004 | Probert, Jr. et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 | 4/2005 | Hull |
| 6,901,361 B1 | 5/2005 | Portilla |
| 6,904,402 B1 | 6/2005 | Wang et al. |
| 6,952,665 B1 | 10/2005 | Shimomura et al. |
| 6,983,239 B1 | 1/2006 | Epstein |
| 6,993,473 B2 | 1/2006 | Cartus |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,050,964 B2 | 5/2006 | Menzes et al. |
| 7,085,708 B2 | 8/2006 | Manson |
| 7,089,493 B2 * | 8/2006 | Hatori et al. ............ 715/259 |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,143,036 B2 | 11/2006 | Weise |
| 7,146,358 B1 | 12/2006 | Gravano et al. |
| 7,149,688 B2 | 12/2006 | Schalkwyk |
| 7,171,348 B2 | 1/2007 | Scanlan |
| 7,174,289 B2 | 2/2007 | Sukehiro |
| 7,177,792 B2 | 2/2007 | Knight et al. |
| 7,191,115 B2 | 3/2007 | Moore |
| 7,194,403 B2 | 3/2007 | Okura et al. |
| 7,197,451 B1 | 3/2007 | Carter et al. |

(56) References Cited

U.S. PATENT DOCUMENTS

| | | | |
|---|---|---|---|
| 7,206,736 B2 | 4/2007 | Moore | |
| 7,209,875 B2 | 4/2007 | Quirk et al. | |
| 7,219,051 B2 | 5/2007 | Moore | |
| 7,239,998 B2 | 7/2007 | Xun | |
| 7,249,012 B2 | 7/2007 | Moore | |
| 7,249,013 B2 | 7/2007 | Al-Onaizan et al. | |
| 7,283,950 B2 | 10/2007 | Pournasseh et al. | |
| 7,295,962 B2 | 11/2007 | Marcu | |
| 7,295,963 B2 | 11/2007 | Richardson et al. | |
| 7,302,392 B1 | 11/2007 | Thenthiruperai et al. | |
| 7,319,949 B2 | 1/2008 | Pinkham | |
| 7,340,388 B2 | 3/2008 | Soricut et al. | |
| 7,346,487 B2 | 3/2008 | Li | |
| 7,346,493 B2 | 3/2008 | Ringger et al. | |
| 7,349,839 B2 | 3/2008 | Moore | |
| 7,349,845 B2 | 3/2008 | Coffman et al. | |
| 7,356,457 B2 | 4/2008 | Pinkham et al. | |
| 7,369,998 B2 * | 5/2008 | Sarich et al. | 704/277 |
| 7,373,291 B2 | 5/2008 | Garst | |
| 7,383,542 B2 | 6/2008 | Richardson et al. | |
| 7,389,222 B1 | 6/2008 | Langmead et al. | |
| 7,389,234 B2 | 6/2008 | Schmid et al. | |
| 7,403,890 B2 | 7/2008 | Roushar | |
| 7,409,332 B2 | 8/2008 | Moore | |
| 7,409,333 B2 * | 8/2008 | Wilkinson et al. | 704/2 |
| 7,447,623 B2 | 11/2008 | Appleby | |
| 7,454,326 B2 | 11/2008 | Marcu et al. | |
| 7,496,497 B2 | 2/2009 | Liu | |
| 7,533,013 B2 | 5/2009 | Marcu | |
| 7,536,295 B2 | 5/2009 | Cancedda et al. | |
| 7,546,235 B2 | 6/2009 | Brockett et al. | |
| 7,552,053 B2 | 6/2009 | Gao et al. | |
| 7,565,281 B2 | 7/2009 | Appleby | |
| 7,574,347 B2 | 8/2009 | Wang | |
| 7,580,828 B2 | 8/2009 | D'Agostini | |
| 7,580,830 B2 | 8/2009 | Al-Onaizan et al. | |
| 7,587,307 B2 | 9/2009 | Cancedda et al. | |
| 7,620,538 B2 | 11/2009 | Marcu et al. | |
| 7,620,632 B2 | 11/2009 | Andrews | |
| 7,624,005 B2 | 11/2009 | Koehn et al. | |
| 7,624,020 B2 | 11/2009 | Yamada et al. | |
| 7,627,479 B2 * | 12/2009 | Travieso et al. | 704/277 |
| 7,680,646 B2 | 3/2010 | Lux-Pogodalla et al. | |
| 7,689,405 B2 | 3/2010 | Marcu | |
| 7,698,124 B2 | 4/2010 | Menezes et al. | |
| 7,698,125 B2 | 4/2010 | Graehl et al. | |
| 7,707,025 B2 | 4/2010 | Whitelock | |
| 7,711,545 B2 | 5/2010 | Koehn | |
| 7,716,037 B2 * | 5/2010 | Precoda et al. | 704/2 |
| 7,801,720 B2 * | 9/2010 | Satake et al. | 704/4 |
| 7,813,918 B2 | 10/2010 | Muslea et al. | |
| 7,822,596 B2 | 10/2010 | Elgazzar et al. | |
| 7,925,494 B2 | 4/2011 | Cheng et al. | |
| 7,957,953 B2 | 6/2011 | Moore | |
| 7,974,833 B2 | 7/2011 | Soricut et al. | |
| 8,060,360 B2 | 11/2011 | He | |
| 8,145,472 B2 | 3/2012 | Shore et al. | |
| 8,214,196 B2 | 7/2012 | Yamada et al. | |
| 8,244,519 B2 | 8/2012 | Bicici et al. | |
| 8,265,923 B2 | 9/2012 | Chatterjee et al. | |
| 8,275,600 B2 | 9/2012 | Bilac et al. | |
| 8,315,850 B2 | 11/2012 | Furuuchi et al. | |
| 8,615,389 B1 | 12/2013 | Marcu | |
| 8,655,642 B2 | 2/2014 | Fux | |
| 8,666,725 B2 | 3/2014 | Och | |
| 8,676,563 B2 | 3/2014 | Soricut et al. | |
| 2001/0009009 A1 | 7/2001 | Iizuka | |
| 2001/0029455 A1 | 10/2001 | Chin et al. | |
| 2002/0002451 A1 | 1/2002 | Sukehiro | |
| 2002/0013693 A1 | 1/2002 | Fuji | |
| 2002/0040292 A1 | 4/2002 | Marcu | |
| 2002/0046018 A1 | 4/2002 | Marcu et al. | |
| 2002/0046262 A1 | 4/2002 | Heilig et al. | |
| 2002/0059566 A1 | 5/2002 | Delcambre et al. | |
| 2002/0078091 A1 | 6/2002 | Vu et al. | |
| 2002/0083029 A1 | 6/2002 | Chun et al. | |
| 2002/0087313 A1 | 7/2002 | Lee et al. | |
| 2002/0099744 A1 | 7/2002 | Coden et al. | |
| 2002/0111788 A1 | 8/2002 | Kimpara | |
| 2002/0111789 A1 * | 8/2002 | Hull | 704/4 |
| 2002/0111967 A1 * | 8/2002 | Nagase | 707/513 |
| 2002/0143537 A1 | 10/2002 | Ozawa et al. | |
| 2002/0152063 A1 | 10/2002 | Tokieda et al. | |
| 2002/0169592 A1 | 11/2002 | Aityan | |
| 2002/0188438 A1 | 12/2002 | Knight et al. | |
| 2002/0198699 A1 | 12/2002 | Greene et al. | |
| 2002/0198701 A1 | 12/2002 | Moore | |
| 2003/0009322 A1 | 1/2003 | Marcu | |
| 2003/0023423 A1 | 1/2003 | Yamada et al. | |
| 2003/0040900 A1 | 2/2003 | D'Agostini | |
| 2003/0061022 A1 | 3/2003 | Reinders | |
| 2003/0144832 A1 | 7/2003 | Harris | |
| 2003/0154071 A1 * | 8/2003 | Shreve | 704/9 |
| 2003/0158723 A1 | 8/2003 | Masuichi et al. | |
| 2003/0176995 A1 | 9/2003 | Sukehiro | |
| 2003/0182102 A1 | 9/2003 | Corston-Oliver et al. | |
| 2003/0191626 A1 | 10/2003 | Al-Onaizan et al. | |
| 2003/0204400 A1 | 10/2003 | Marcu et al. | |
| 2003/0216905 A1 | 11/2003 | Chelba et al. | |
| 2003/0217052 A1 | 11/2003 | Rubenczyk et al. | |
| 2003/0233222 A1 | 12/2003 | Soricut et al. | |
| 2004/0006560 A1 | 1/2004 | Chan et al. | |
| 2004/0015342 A1 | 1/2004 | Garst | |
| 2004/0024581 A1 | 2/2004 | Koehn et al. | |
| 2004/0030551 A1 | 2/2004 | Marcu et al. | |
| 2004/0035055 A1 | 2/2004 | Zhu et al. | |
| 2004/0044530 A1 | 3/2004 | Moore | |
| 2004/0068411 A1 | 4/2004 | Scanlan | |
| 2004/0098247 A1 | 5/2004 | Moore | |
| 2004/0102956 A1 * | 5/2004 | Levin | 704/2 |
| 2004/0102957 A1 * | 5/2004 | Levin | 704/3 |
| 2004/0111253 A1 | 6/2004 | Luo et al. | |
| 2004/0115597 A1 | 6/2004 | Butt | |
| 2004/0122656 A1 | 6/2004 | Abir | |
| 2004/0167768 A1 | 8/2004 | Travieso et al. | |
| 2004/0167784 A1 | 8/2004 | Travieso et al. | |
| 2004/0193401 A1 | 9/2004 | Ringger et al. | |
| 2004/0230418 A1 | 11/2004 | Kitamura | |
| 2004/0237044 A1 | 11/2004 | Travieso et al. | |
| 2004/0260532 A1 | 12/2004 | Richardson et al. | |
| 2005/0021322 A1 * | 1/2005 | Richardson et al. | 704/2 |
| 2005/0021517 A1 | 1/2005 | Marchisio | |
| 2005/0033565 A1 | 2/2005 | Koehn | |
| 2005/0038643 A1 | 2/2005 | Koehn | |
| 2005/0055199 A1 | 3/2005 | Ryzchachkin et al. | |
| 2005/0055217 A1 | 3/2005 | Sumita et al. | |
| 2005/0060160 A1 | 3/2005 | Roh et al. | |
| 2005/0075858 A1 | 4/2005 | Pournasseh et al. | |
| 2005/0086226 A1 | 4/2005 | Krachman | |
| 2005/0102130 A1 | 5/2005 | Quirk et al. | |
| 2005/0125218 A1 | 6/2005 | Rajput et al. | |
| 2005/0149315 A1 | 7/2005 | Flanagan et al. | |
| 2005/0171757 A1 | 8/2005 | Appleby | |
| 2005/0204002 A1 | 9/2005 | Friend | |
| 2005/0228640 A1 | 10/2005 | Aue et al. | |
| 2005/0228642 A1 | 10/2005 | Mau et al. | |
| 2005/0228643 A1 | 10/2005 | Munteanu et al. | |
| 2005/0267738 A1 * | 12/2005 | Wilkinson et al. | 704/9 |
| 2006/0004563 A1 | 1/2006 | Campbell et al. | |
| 2006/0015320 A1 | 1/2006 | Och | |
| 2006/0015323 A1 | 1/2006 | Udupa et al. | |
| 2006/0020448 A1 | 1/2006 | Chelba et al. | |
| 2006/0041428 A1 | 2/2006 | Fritsch et al. | |
| 2006/0095248 A1 | 5/2006 | Menezes et al. | |
| 2006/0111891 A1 | 5/2006 | Menezes et al. | |
| 2006/0111892 A1 | 5/2006 | Menezes et al. | |
| 2006/0111896 A1 | 5/2006 | Menezes et al. | |
| 2006/0129424 A1 | 6/2006 | Chan | |
| 2006/0142995 A1 | 6/2006 | Knight et al. | |
| 2006/0150069 A1 | 7/2006 | Chang | |
| 2006/0167984 A1 | 7/2006 | Fellenstein et al. | |
| 2006/0190241 A1 | 8/2006 | Goutte et al. | |
| 2007/0016400 A1 | 1/2007 | Soricutt et al. | |
| 2007/0016401 A1 | 1/2007 | Ehsani et al. | |

(56) References Cited

U.S. PATENT DOCUMENTS

| | | |
|---|---|---|
| 2007/0033001 A1 | 2/2007 | Muslea et al. |
| 2007/0050182 A1 | 3/2007 | Sneddon et al. |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0219774 A1 | 9/2007 | Quirk et al. |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore et al. |
| 2008/0052061 A1* | 2/2008 | Kim et al. ........................ 704/4 |
| 2008/0065478 A1 | 3/2008 | Kohlmeier et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0106017 A1 | 4/2009 | D'Agostini |
| 2009/0119091 A1 | 5/2009 | Sarig |
| 2009/0125497 A1 | 5/2009 | Jiang et al. |
| 2009/0234634 A1 | 9/2009 | Chen et al. |
| 2009/0241115 A1 | 9/2009 | Raffo et al. |
| 2009/0326912 A1 | 12/2009 | Ueffing |
| 2009/0326913 A1 | 12/2009 | Simard et al. |
| 2010/0005086 A1 | 1/2010 | Wang et al. |
| 2010/0017293 A1 | 1/2010 | Lung et al. |
| 2010/0042398 A1 | 2/2010 | Marcu et al. |
| 2010/0138210 A1 | 6/2010 | Seo et al. |
| 2010/0138213 A1 | 6/2010 | Bicici et al. |
| 2010/0174524 A1 | 7/2010 | Koehn |
| 2011/0029300 A1 | 2/2011 | Marcu et al. |
| 2011/0066643 A1 | 3/2011 | Cooper et al. |
| 2011/0082684 A1 | 4/2011 | Soricut et al. |
| 2011/0191410 A1 | 8/2011 | Refuah et al. |
| 2012/0096019 A1 | 4/2012 | Manickam et al. |
| 2012/0253783 A1 | 10/2012 | Castelli et al. |
| 2012/0278302 A1 | 11/2012 | Choudhury et al. |
| 2012/0323554 A1 | 12/2012 | Hopkins et al. |
| 2014/0019114 A1 | 1/2014 | Travieso et al. |

FOREIGN PATENT DOCUMENTS

| | | |
|---|---|---|
| EP | 0715265 | 6/1996 |
| EP | 0933712 | 8/1999 |
| EP | 0933712 A3 | 1/2001 |
| JP | 07244666 | 1/1995 |
| JP | 10011447 | 1/1998 |
| JP | 11272672 | 10/1999 |
| JP | 2004501429 | 1/2004 |
| JP | 2004062726 | 2/2004 |
| JP | 2008101837 | 5/2008 |
| JP | 5452868 | 1/2014 |
| WO | WO03083709 | 10/2003 |

OTHER PUBLICATIONS

Knight, K. and Luk, S., "Building a Large-Scale Knowledge Base for Machine Translation," 1994, Proc. of the 12th Conference on Artificial Intelligence, pp. 773-778.

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396.

Knight, Kevin, "Integrating Knowledge Acquisition and Language Acquisition," May 1992, Journal of Applied Intelligence, vol. 1, No. 4.

Knight et al., "Integrating Knowledge Bases and Statistics in MT," 1994, Proc. of the Conference of the Association for Machine Translation in the Americas.

Knight, Kevin, "Learning Word Meanings by Instruction," 1996, Proc. of the D National Conference on Artificial Intelligence, vol. 1, pp. 447-454.

Knight, K. and Graehl, J., "Machine Transliteration", 1997, Proc. of the ACL-97, Madrid, Spain.

Knight, K. et al., "Machine Transliteration of Names in Arabic Text," 2002, Proc. of the ACL Workshop on Computational Approaches to Semitic Languages.

Knight, K. and Marcu, D., "Statistics-Based Summarization—Step One: Sentence Compression," 2000, American Association for Artificial Intelligence Conference, pp. 703-710.

Knight, K. et al., "Translation with Finite-State Devices," 1998, Proc. of the 3rd AMTA Conference, pp. 421-437.

Knight, K. and Hatzivassiloglou, V., "Two-Level, Many-Paths Generation," D 1995, Proc. of the 33rd Annual Conference of the ACL, pp. 252-260.

Knight, Kevin, "Unification: A Multidisciplinary Survey," 1989, ACM Computing Surveys, vol. 21, No. 1.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Kurohashi, S. and Nagao, M., "Automatic Detection of Discourse Structure by Checking Surface Information in Sentences," 1994, Proc. of COL-LING '94, vol. 2, pp. 1123-1127.

Langkilde-Geary, Irene, "An Empirical Verification of Coverage and Correctness for a General-Purpose Sentence Generator," 1998, Proc. 2nd Int'l Natural Language Generation Conference.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde, Irene, "Forest-Based Statistical Sentence Generation," 2000, Proc. of the 1st Conference on North American chapter of the ACL, Seattle, WA, pp. 170-171.

Langkilde, I. and Knight, K., "The Practical Value of N-Grams in Generation," 1998, Proc. of the 9th International Natural Language Generation Workshop, pp. 248-255.

Langkilde, I. and Knight, K., "Generation that Exploits Corpus-Based Statistical Knowledge," 1998, Proc. of the COLING-ACL, pp. 704-710.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [redacted].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

(56) References Cited

OTHER PUBLICATIONS

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.
Marcu, Daniel, "Discourse trees are good indicators of importance in text," 1999, Advances in Automatic Text Summarization, The MIT Press, Cambridge, MA.
Marcu, Daniel, "Instructions for Manually Annotating the Discourse Structures of Texts," 1999, Discourse Annotation, pp. 1-49.
Marcu, Daniel, "The Rhetorical Parsing of Natural Language Texts," 1997, Proceedings of ACL/EACL '97, pp. 96-103.
Marcu, Daniel, "The Rhetorical Parsing, Summarization, and Generation of Natural Language Texts," 1997, Ph.D. Thesis, Graduate Department of Computer Science, University of Toronto.
Marcu, Daniel, "Towards a Unified Approach to Memory- and Statistical-Based Machine Translation," 2001, Proc. of the 39th Annual Meeting of the ACL, pp. 378-385.
Melamed, I. Dan, "A Word-to-Word Model of Translational Equivalence," 1997, Proc. of the 35th Annual Meeting of the ACL, Madrid, Spain, pp. 490-497.
Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.
Melamed, I. Dan, "Empirical Methods for Exploiting Parallel Texts," 2001, MIT Press, Cambridge, MA [table of contents].
Meng et al. "Generating Phonetic Cognates to Handle Named Entities in English-Chinese Cross-Language Spoken Document Retrieval," 2001, IEEE Workshop on Automatic Speech Recognition and Understanding. pp. 311-314.
Milke et al., "A full-text retrieval system with a dynamic abstract generation function," 1994, Proceedings of SI-GIR '94, pp. 152-161.
Mikheev et al., "Named Entity Recognition without Gazeteers," 1999, Proc. of European Chapter of the ACL, Bergen, Norway, pp. 1-8.
Monasson et al., "Determining computational complexity from characteristic 'phase transitions'," Jul. 1999, Nature Magazine, vol. 400, pp. 133-137.
Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.
Niessen,S. and Ney, H, "Toward hierarchical models for statistical machine translation of inflected languages," 2001, Data-Driven Machine Translation Workshop, Toulouse, France, pp. 47-54.
Och, F. and Ney, H, "Improved Statistical Alignment Models," 2000, 38th Annual Meeting of the ACL, Hong Kong, pp. 440-447.
Och et al., "Improved Alignment Models for Statistical Machine Translation," 1999, Proc. of the Joint Conf. of Empirical Methods in Natural Language Processing and Very Large Corpora, pp. 20-28.
Papineni et al., "Bleu: a Method for Automatic Evaluation of Machine Translation," 2001, IBM Research Report, RC22176(WQ102-022).
Pla et al., "Tagging and Chunking with Bigrams," 2000, Proc. of the 18th Conference on Computational Linguistics, vol. 2, pp. 614-620.
Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Resnik, P. and Yarowsky, D. "A Perspective on Word Sense Disambiguation Methods and Their Evaluation," 1997, Proceedings of SIGLEX '97, Washington, D.C., pp. 79-86.
Resnik, Philip, "Mining the Web for Bilingual Text," 1999, 37th Annual Meeting of the ACL, College Park, MD, pp. 527-534.
Knight, Kevin, "Integrating Knowledge Acquisition and Language Acquisition", May 1992, Journal of Applied Intelligence, vol. 1J, No. 4.
Abney, Stephen, "Parsing by Chunks," 1991, Principle-Based Parsing: Computation and Psycholinguistics, vol. 44, pp. 257-279.
Al-Onaizan et al., "Statistical Machine Translation," 1999, JHU Summer Tech Workshop, Final Report, pp. 1-42.
Al-Onaizan,Y. and Knight, K., "Named Entity Translation: Extended Abstract", 2002, Proceedings of HLT-02, San Diego, CA.
Al-Onaizan, Y. and Knight, K., "Translating Named Entities Using Monolingual and Bilingual Resources," 2002, Proc. of the 40th Annual Meeting of the ACL, pp. 400-408.
Al-Onaizan et al., "Translating with Scarce Resources," 2000, 17th National Conference of the American Association for Artificial Intelligence, Austin, TX, pp. 672-678.
Alshawi et al., "Learning Dependency Translation Models as Collections of Finite-State Head Transducers," 2000, Computational Linguistics, vol. 26, pp. 45-60.
Arbabi et al., "Algorithms for Arabic name transliteration," Mar. 1994, IBM Journal of Research and Development, vol. 38, Issue 2, pp. 183-194.
Barnett et al., "Knowledge and Natural Language Processing," Aug. 1990, Communications of the ACM, vol. 33, Issue 8, pp. 50-71.
Bangalore, S. and Rambow, O., "Corpus-Based Lexical Choice in Natural Language Generation," 2000, Proc. of the 38th Annual ACL, Hong Kong, pp. 464-471.
Bangalore, S. and Rambow, O., "Exploiting a Probabilistic Hierarchical Model for Generation," 2000, Proc. of 18th conf. on Computational Linguistics, vol. 1, pp. 42-48.
Bangalore, S. and Rambow, 0., "Evaluation Metrics for Generation," 2000, Proc. of the 1st International Natural Language Generation Conf., vol. 14, pp. 1-8.
Bangalore, S. and Rambow, 0., "Using TAGs, a Tree Model, and a Language Model for Generation," May 2000, Workshop TAG+5, Paris.
Baum, Leonard, "An Inequality and Associated Maximization Technique in Statistical Estimation for Probabilistic Functions of Markov Processes", 1972, Inequalities 3:1-8.
Bikel et al., "An Algorithm that Learns What's in a Name," 1999, Machine Learning Journal Special Issue on Natural Language Learning, vol. 34, pp. 211-232.
Brants, Thorsten, "TnT—A Statistical Part-of-Speech Tagger," 2000, Proc. of the 6th Applied Natural Language Processing Conference, Seattle.
Brill, Eric. "Transformation-Based Error-Driven Learning and Natural Language Processing: A Case Study in Part of Speech Tagging"; 1995, Computational Linguistics, vol. 21, No. 4, pp. 543-565.
Brown et al., "A Statistical Approach to Machine Translation," Jun. 1990, Computational Linguistics, vol. 16, No. 2, pp. 79-85.
Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118.
Brown et al., "The Mathematics of Statistical Machine Translation: Parameter D Estimation," 1993, Computational Linguistics, vol. 19, Issue 2, pp. 263-311.
Brown et al., "Word-Sense Disambiguation Using Statistical Methods," 1991, Proc. of 29th Annual ACL, pp. 264-270.
Carl, Michael. "A Constructivist Approach to Machine Translation," 1998, New Methods of Language Processing and Computational Natural Language Learning, pp. 247-256.
Chen, K. and Chen, H., "Machine Translation: An Integrated Approach," 1995, Proc. of 6th Int'l Cont. on Theoretical and Methodological Issue in MT, pp. 287-294.
Chinchor, Nancy, "MUC-7 Named Entity Task Definition," 1997, Version 3.5.
Clarkson, P. and Rosenfeld, R., "Statistical Language Modeling Using the CMU-Cambridge Toolkit", 1997, Proc. ESCA Eurospeech, Rhodes, Greece, pp. 2707-2710.
Corston-Oliver, Simon, "Beyond String Matching and Cue Phrases: Improving Efficiency and Coverage in Discourse Analysis", 1998, The MAI Spring Symposium on Intelligent Text Summarization, pp. 9-15.
Dagan, I. and Itai, A., "Word Sense Disambiguation Using a Second Language Monolingual Corpus", 1994, Computational Linguistics, vol. 20, No. 4, pp. 563-596.

(56) References Cited

OTHER PUBLICATIONS

Dempster et al., "Maximum Likelihood from Incomplete Data via the EM Algorithm", 1977, Journal of the Royal Statistical Society, vol. 39, No. 1, pp. 1-38.
Diab, M. and Finch, S., "A Statistical Word-Level Translation Model for Comparable Corpora," 2000, In Proc.of the Conference on Content Based Multimedia Information Access (RIAO).
Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.
Elhadad, M. and Robin, J., "Controlling Content Realization with Functional Unification Grammars", 1992, Aspects of Automated Natural Language Generation, Dale et al. (eds)., Springer Verlag, pp. 89-104.
Elhadad et al., "Floating Constraints in Lexical Choice", 1996, ACL, 23(2): 195-239.
Elhadad, Michael, "FUF: The Universal Unifier User Manual Version 5.2", 1993, Department of Computer Science, Ben Gurion University, Beer Sheva, Israel.
Elhadad. M., and Robin, J., "SURGE: a Comprehensive Plug-in Syntactic Realization Component for Text Generation", 1999 (available at http://www.cs.bgu.ac.il/-elhadad/pub.html).
Elhadad, Michael, "Using Argumentation to Control Lexical Choice: A Functional Unification Implementation", 1992, Ph.D. Thesis, Graduate School of Arts and Sciences, Columbia University.
Fung, Pascale, "Compiling Bilingual Lexicon Entries From a Non-Parallel English-Chinese Corpus", 1995, Proc, of the Third Workshop on Very Large Corpora, Boston, MA, pp. 173-183.
Fung, P. and Vee, L., "An IR Approach for Translating New Words from Nonparallel, Comparable Texts", 1998, 36th Annual Meeting of the ACL, 17th International Conference on Computational Linguistics, pp. 414-420.
Gale, W. and Church, K., "A Program for Aligning Sentences in Bilingual Corpora," 1991, 29th Annual Meeting of the ACL, pp. 177-183.
Germann, Ulrich: "Building a Statistical Machine Translation System from Scratch: How Much Bang for the Buck Can We Expect?" Proc. of the Data-Driven MT Workshop of ACL-01, Toulouse, France, 2001.
Germann et al., "Fast Decoding and Optimal Decoding for Machine Translation", 2001, Proc. of the 39th Annual Meeting of the ACL, Toulouse, France, pp. 228-235.
Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.
Grefenstette, Gregory, "The World Wide Web as a Resource for Example-Based Machine Translation Tasks", 1999, Translating and the Computer 21, Proc. of the 21 st International Cant. on Translating and the Computer. London, UK, 12 pp.
Hatzivassiloglou, V. et al., "Unification-Based Glossing",. 1995, Proc. of the International Joint Conference on Artificial Intelligence, pp. 1382-1389.
Ide, N. and Veronis, J., "Introduction to the Special Issue on Word Sense Disambiguation: The State of the Art", Mar. 1998, Computational Linguistics, vol. 24, Issue 1, pp. 2-40.
Imamura, Kenji, "Hierarchical Phrase Alignment Harmonized with Parsing", 2001, in Proc. of NLPRS, Tokyo.
Jelinek, F., "Fast Sequential Decoding Algorithm Using a Stack", Nov. 1969, IBM J. Res. Develop., vol. 13, No. 6, pp. 675-685.
Jones, K. Sparck, "Experiments in Relevance Weighting of Search Terms", 1979, Information Processing & Management, vol. 15, Pergamon Press Ltd., UK, pp. 133-144.
Knight, K. and Yamada, K., "A Computational Approach to Deciphering Unknown Scripts," 1999, Proc. of the ACL Workshop on Unsupervised Learning in Natural Language Processing.
Knight, K. and Al-Onaizan, Y., "A Primer on Finite-State Software for Natural Language Processing", 1999 (available at http://www.isLedullicensed-sw/carmel).
Knight, Kevin, "A Statistical MT Tutorial Workbook," 1999, JHU Summer Workshop (available at http://www.isLedu/natural-language/mUwkbk.rtf).
Knight, Kevin, "Automating Knowledge Acquisition for Machine Translation," 1997, AI Magazine 18(4).
Rich, E. and Knight, K., "Artificial Intelligence, Second Edition," 1991, McGraw-Hili Book Company [redacted].
Richard et al., "Visiting the Traveling Salesman Problem with Petri nets and application in the glass industry," Feb. 1996, IEEE Emerging Technologies and Factory Automation, pp. 238-242.
Robin, Jacques, "Revision-Based Generation of Natural Language Summaries Providing Historical Background: Corpus-Based Analysis, Design Implementation and Evaluation," 1994, Ph.D. Thesis, Columbia University, New York.
Sang, E. and Buchholz, S., "Introduction to the CoNLL-2000 Shared Task: Chunking," 20002, Proc. of CoNLL-2000 and LLL-2000, Lisbon, Portugal, pp. 127-132.
Schmid, H., and Walde, S., "Robust German Noun Chunking With a Probabilistic Context-Free Grammar," 2000, Proc. of the 18th Conference on Computational Linguistics, vol. 2, pp. 726-732.
Selman et al., "A New Method for Solving Hard Satisfiability Problems," 1992, Proc. of the 10th National Conference on Artificial Intelligence, San Jose, CA, pp. 440-446.
Schutze, Hinrich, "Automatic Word Sense Discrimination," 1998, Computational Linguistics, Special Issue on Word Sense Disambiguation, vol. 24, Issue 1, pp. 97-123.
Sobashima et al., "A Bidirectional Transfer-Driven Machine Translation System for Spoken Dialogues," 1994, Proc. of 15th Conference on Computational Linguistics, vol. 1, pp. 64-68.
Shapiro, Stuart (ed.), "Encyclopedia of Artificial Intelligence, 2nd edition", vol. D 2,1992, John Wiley & Sons Inc; "Unification article", K. Knight, pp. 1630-1637.
Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.
Stalls, B. and Knight, K., "Translating Names and Technical Terms in Arabic Text," 1998, Proc. of the COLING/ACL Workkshop on Computational Approaches to Semitic Language.
Sun et al., "Chinese Named Entity Identification Using Class-based Language Model," 2002, Proc. of 19th International Conference on Computational Linguistics, Taipei, Taiwan, vol. 1, pp. 1-7.
Sumita et al., "A Discourse Structure Analyzer for Japanese Text," 1992, Proc. of the International Conference on Fifth Generation Computer Systems, vol. 2, pp. 1133-1140.
Taylor et al., "The Penn Treebank: An Overview," in A. Abeill (ed.), D Treebanks: Building and Using Parsed Corpora, 2003, pp. 5-22.
Tiedemann, Jorg, "Automatic Construction of Weighted String Similarity Measures," 1999, In Proceedings of the Joint SIGDAT Conference on Emperical Methods in Natural Language Processing and Very Large Corpora.
Tillmann et al., "A DP based Search Using Monotone Alignments in Statistical Translation," 1997, Proc. of the Annual Meeting of the ACL, pp. 366-372.
Tillman, C. and Xia, F., "A Phrase-Based Unigram Model for Statistical Machine Translation," 2003, Proc. of the North American Chapter of the ACL on Human Language Technology, vol. 2, pp. 106-108.
Veale, T. and Way, A., "Gaijin: A Bootstrapping, Template-Driven Approach to Example-Based MT," 1997, Proc. of New Methods in Natural Language Processing (NEMPLP97), Sofia, Bulgaria.
Vogel, S. and Ney, H., "Construction of a Hierarchical Translation Memory," 2000, Proc. of Cooling 2000, Saarbrucken, Germany, pp. 1131-1135.
Vogel et al., "The CMU Statistical Machine Translation System," 2003, Machine Translation Summit IX, New Orleans, LA.
Vogel et al., "The Statistical Translation Module in the Verbmobil System," 2000, Workshop on Multi-Lingual Speech Communication, pp. 69-74.
Wang, Ye-Yi, "Grammar Interference and Statistical Machine Translation," 1998, Ph.D Thesis, Carnegie Mellon University, Pittsburgh, PA.

(56) References Cited

OTHER PUBLICATIONS

Watanbe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.
Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.
Wang, Y. and Waibel, A., "Decoding Algorithm in Statistical Machine Translation," 1996, Proc. of the 35th Annual Meeting of the ACL, pp. 366-372.
Wu, Dekai, "Stochastic Inversion Transduction Grammars and Bilingual Parsing of Parallel Corpora," 1997, Computational Linguistics, vol. 23, Issue 3, pp. 377-403.
Wu, Dekai, "A Polynomial-Time Algorithm for Statistical Machine Translation," 1996, Proc. of 34th Annual Meeting of the ACL, pp. 152-158.
Yamada, K. and Knight, K., "A Decoder for Syntax-based Statistical MT," 2001, Proceedings of the 40th Annual Meeting of the ACL, pp. 303-310.
Yamada, K. and Knight, K. "A Syntax-based Statistical Translation Model," D 2001, Proc. of the 39th Annual Meeting of the ACL, pp. 523-530.
Yamamoto et al., "A Comparative Study on Translation Units for Bilingual Lexicon Extraction," 2001, Japan Academic Association for Copyright Clearance, Tokyo, Japan.
Yarowsky, David, "Unsupervised Word Sense Disambiguation Rivaling Supervised Methods," 1995, 33rd Annual Meeting of the ACL, pp. 189-196.
Callan et al., "TREC and TIPSTER 'Experiments with Inquery," 1994, Information Processing and Management, vol. 31, Issue 3, pp. 327-343.
Cohen, Yossi, "Interpreter for FUF," (available at ftp:/lftp.cs.bgu.ac.il/ pUb/people/elhadad/fuf-life.lf).
Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.
Nederhof, M. and Satta, G., "IDL-Expressions: A Formalism for Representing and Parsing Finite Languages in Natural Language Processing," 2004, Journal of Artificial Intelligence Research, vol. 21, pp. 281-287.
Och, F. and Ney, H., "Discriminative Training and Maximum Entropy Models for Statistical Machine Translation," 2002, Proc. of the 40th Annual Meeting of the ACL, Philadelphia, PA, pp. 295-302.
Resnik, P. and Smith, A., "The Web as a Parallel Corpus," Sep. 2003, Computational Linguistics, Special Issue on Web as Corpus, vol. 29, Issue 3, pp. 349-380.
Russell, S. And Norvig, P., "Artificial Intelligence: A Modern Approach," 1995, Prentice-Hall, Inc., New Jersey [redacted—table of contents].
Ueffing et al., "Generation of Word Graphs in Statistical Machine Translation," 2002, Proc. of Empirical Methods in Natural Language Processing (EMNLP), pp. 156-163.
Kumar, R. and L1, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727.
Yamada-K., "A Syntax-Basaed Statistical Translation Model," 2002 PhD Disseration, pp. 1-141.
Al-Onaizan et al., "Translation with Scarce Resources," 2000 Univ. of Southern Calif., pp. 1-7.
Imamura et al., "Feedback Cleaning of Machine Translation Rules Using Automatic Evaluation," 2003 Computational Linguistics, pp. 447-454.
Lee-Y.S.,"Neural Network Approach to Adaptive Learning: with an Application to Chinese Homophone Disambiguation," IEEE pp. 1521-1526.
Rayner et al.,"Hybrid Language Processing in the Spoken Language Translator," IEEE, pp. 107-110.
Rogati et al., "Resource Selection for Domain-Specific Cross-Lingual IR," ACM 2004, pp. 154-161.
Patent Cooperation Treaty International Preliminary Report on Patentability and The Written Opinion, International application No. PCT/US2008/004296, Oct. 6, 2009, 5 pgs.
Koehn, P., et al, "Statistical Phrase-Based Translation," Proceedings of HLT-NAACL 2003 Main Papers , pp. 48-54 Edmonton, May-Jun. 2003.
Abney, S.P., "Stochastic Attribute Value Grammars", Association for Computional Linguistics, 1997, pp. 597-618.
Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.
Tillman, C., et al, "Word Reordering and a Dynamic Programming Beam Search Algorithm for Statistical Machine Translation" <URL: http://acl.ldc.upenn.edu/J/J03/J03-1005.pdf>.
Wang, W., et al. "Capitalizing Machine Translation" In HLT-NAACL '06 Proceedings Jun. 2006. <http://www.isi.edu/natural-language/mt/hlt-naacl-06-wang.pdf>.
Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.
Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354.
Frederking et al., "Three Heads are Better Than One," In Proceedings of the 4th Conference on Applied Natural Language Processing, Stuttgart, Germany, 1994, pp. 95-100.
Och et al., "Discriminative Training and Maximum Entropy Models for Statistical Machine Translation," In Proc. of the 40th Annual Meeting of the Association for Computational Linguistics (ACL), Philadelphia, PA, 2002.
Yasuda et al., "Automatic Machine Translation Selection Scheme to Output the Best Result," Proc of LREC, 2002, pp. 525-528.
Agbago, A., et al., "True-casing for the Portage System," In Recent Advances in Natural Language Processing (Borovets, Bulgaria), Sep. 21-23, 2005, pp. 21-24.
Alshawi, Hiyan, "Head Automata for Speech Translation", Proceedings of the ICSLP 96, 1996, Philadelphia, Pennslyvania.
Ambati, "Dependency Structure Trees in Syntax Based Machine Translation," Spring 2008 Report <http://www.cs.cmu.edu/~vamshi/publications/DependencyMT_report.pdf>, pp. 1-8.
Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.
Ballesteros, L. et al., "Phrasal Translation and Query Expansion Techniques for Cross-Language Information Retrieval," SIGIR 97, Philadelphia, PA, © 1997, pp. 84-91.
Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.
Berhe, G. et al., "Modeling Service-baed Multimedia Content Adaptation in Pervasive Computing," CF '04 (Ischia, Italy) Apr. 14-16, 2004, pp. 60-69.
Boitet, C. et al., "Main Research Issues in Building Web Services," Proc. of the 6th Symposium on Natural Language Processing, Human and Computer Processing of Language and Speech, © 2005, pp. 1-11.
Brill, Eric, "Transformation-Based Error-Driven Learning and Natural Language Processing: A Case Study in Part of Speech Tagging", 1995, Assocation for Computational Linguistics, vol. 21, No. 4, pp. 1-37

(56) References Cited

OTHER PUBLICATIONS

Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.
Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.
Cheung et al., "Sentence Alignment in Parallel, Comparable, and Quasi-comparable Corpora", In Proceedings of LREC, 2004, pp. 30-33.
Covington, "An Algorithm to Align Words for Historical Comparison", Computational Linguistics, 1996, 22(4), pp. 481-496.
Eisner, Jason, "Learning Non-Isomorphic Tree Mappings for Machine Translation," 2003, in Proc. of the 41st Meeting of the ACL, pp. 205-208.
Fleming, Michael et al., "Mixed-Initiative Translation of Web Pages," AMTA 2000, LNAI 1934, Springer-Verlag, Berlin, Germany, 2000, pp. 25-29.
Franz Josef Och, Hermann Ney, "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> 'retrieved on May 6, 2004! abstract.
Fuji Ren and Hongchi Shi, "Parallel Machine Translation: Principles and Practice," Engineering of Complex Computer Systems, 2001 Proceedings, Seventh IEEE Int'l. Conference, pp. 249-259, 2001.
Fung et al, "Mining Very-non parallel corpora: Parallel Sentence and lexicon extraction via bootstrapping and EM", In EMNLP 2004.
Gale, W. and Church, K., "A Program for Aligning Sentences in Bilingual Corpora," 1993, Computational Linguisitcs, vol. 19, No. 1, pp. 177-184.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL 2004, July.
Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.
Grossi et al, "Suffix Trees and Their Applications in String Algorithms", In. Proceedings of the 1st South American Workshop on String Processing, Sep. 1993, pp. 57-76.
Habash, Nizar, "The Use of a Structural N-gram Language Model in Generation-Heavy Hybrid Machine Translation," University of Maryland, Univ. Institute for Advance Computer Studies, Sep. 8, 2004.
Huang et al., "Relabeling Syntax Trees to Improve Syntax-Based Machine Translation Quality," Jun. 4-9, 2006, in Proc. of the Human Language Techology Conference of the North Americna Chapter of the ACL, pp. 240-247.
Ikel, D., Schwartz, R., and Weischedei, R., "An Algorithm that learns What's in a Name," Machine Learning 34, 211-231 (1999).
Klein et al., "Accurate Unlexicalized Parsing," Jul. 2003m, in Proc. of the 41st Annual Meeting of the ACL, pp. 423-430.
Koehn, Philipp, "Noun Phrase Translation," A PhD Dissertation for the University of Southern California, pp. xiii, 23, 25-57, 72-81, Dec. 2003.
Kupiec, Julian, "An Algorithm for Finding Noun Phrase Correspondecnes in Bilingual Corpora," In Proceedings of the 31st Annual Meeting of the ACL, 1993, pp. 17-22.
Lita, L., et al., "tRuEcasing," Proceedings of the 41st Annual Meeting of the Assoc. for Computational Linguistics (In Hinrichs, E. and Roth, D.—editors), pp. 152-159.
Llitjos, A. F. et al., "The Translation Correction Tool: English-Spanish User Studies," Citeseer © 2004, downloaded from: http://gs37.sp.cs.cmu.edu/ari/papers/Irec04/fontll, pp. 1-4.
McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.
McDevitt, K. et al., "Designing of a Community-based Translation Center," Technical Report TR-03-30, Computer Science, Virginia Tech, © 2003, pp. 1-8.
Metze, F. et al., "The NESPOLE! Speech-to-Speech Translation System," Proc. of the HLT 2002, 2nd Int'l. Conf. on Human Language Technology (San Francisco, CA), © 2002, pp. 378-383.
Mohri, Mehryar, "Regular Approximation of Context Free Grammars Through Transformation", 2000, pp. 251-261, "Robustness in Language and Speech Technology", Chapter 9, Kluwer Academic Publishers.
Nagao, K. et al., "Semantic Annotation and Transcoding: Making Web Content More Accessible," IEEE Multimedia, vol. 8, Issue 2 Apr.-Jun. 2001, pp. 69-81.
Norvig, Peter, "Techniques for Automatic Memoization with Applications to Context-Free Parsing", Computational Linguistics,1991, pp. 91-98, vol. 17, No. 1.
Och et al. "A Smorgasbord of Features for Statistical Machine Translation." HLTNAACL Conference. Mar. 2004, 8 pages.
Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.
Och, F. and Ney, H., "A Systematic Comparison of Various Statistical Alignment Models," Computational Linguistics, 2003, 29:1, 19-51.
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.
Petrov et al., "Learning Accurate, Compact and Interpretable Tree Annotation," Jun. 4-9, 2006, in Proc. of the Human Language Technology Conference of the North American Chapter of the ACL, pp. 433-440.
Qun, Liu, "A Chinese-English Machine Translation System Based on Micro-Engine Architecture," An Int'l. Conference on Translation and Information Technology, Hong Kong, Dec. 2000, pp. 1-10.
Ruiqiang, Z. et al., "The NiCT-ATR Statistical Machine Translation System for the IWSLT 2006 Evaluation," submitted to IWSLT, 2006.
Kumar, S. and Byrne, W., "Minimum Bayes-Risk Decoding for Statistical Machine Translation." HLTNAACL Conference. Mar. 2004, 8 pages.
Shirai, S., "A Hybrid Rule and Example-based Method for Machine Translation," NTT Communication Science Laboratories, pp. 1-5.
Tanaka, K. and Iwasaki, H. "Extraction of Lexical Translations from Non-Aligned Corpora," Proceedings of COLING 1996.
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.
Tomas, J., "Binary Feature Classification for Word Disambiguation in Statistical Machine Translation," Proceedings of the 2nd Int'l. Workshop on Pattern Recognition, 2002, pp. 1-12.
Uchimoto, K. et al., "Word Translation by Combining Example-Based Methods and Machine Learning Models," Natural LanguageProcessing (Shizen Gengo Shori), vol. 10, No. 3, Apr. 2003, pp. 87-114.
Uchimoto, K. et al., "Word Translation by Combining Example-Based Methods and Machine Learning Models," Natural LanguageProcessing (Shizen Gengo Shori), vol. 10, No. 3, Apr. 2003, pp. 87-114. (English Translation).

(56) References Cited

OTHER PUBLICATIONS

Varga et al., "Parallel Corpora for Medium Density Languages", In Proceedings of RANLP 2005, pp. 590-596.
Yamamoto et al, "Acquisition of Phrase-level Bilingual Correspondence using Dependency Structure" In Proceedings of COLING-2000, pp. 933-939.
Zhang et al., "Synchronous Binarization for Machine Translations," Jun. 4-9, 2006, in Proc. of the Human Language Technology Conference of the North American Chapter of the ACL, pp. 256-263.
Zhang et al., "Distributed Language Modeling for N-best List Reranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.
Document, Wikipedia.com, web.archive.org (Feb. 24, 2004) <http://web.archive.org/web/20040222202831 /http://en.wikipedia.org/wikiiDocument>, Feb. 24, 2004.
Identifying, Dictionary.com, wayback.archive.org (Feb. 28, 2007) <http://wayback.archive.org/web/200501 01 OOOOOO*/http:////dictionary.reference.com//browse//identifying>, Feb. 28, 2005 <http://web.archive.org/web/20070228150533/http://dictionary.-reference.com/browse/identifying>.
Cohen et al., "Spectral Bloom Filters," SIGMOD 2003, Jun. 9-12, 2003, ACM pp. 241-252.
Cohen, "Hardware-Assisted Algorithm for Full-text Large-Dictionary String Matching Using n-gram Hashing," 1998, Information Processing and Management, vol. 34, No. 4, pp. 443-464.
Gupta et al., "Kelips: Building an Efficient and Stable P2P DHT thorough Increased Memory and Background Overhead," 2003 IPTPS, LNCS 2735, pp. 160-169.
Bangalore, S. and Rambow, O., ""Using TAGs, a Tree Model, and a Language Model for Generation,"" May 2000,Workshop TAG+5, Paris.
Gale, W. and Church, K., "A Program for Aligning Sentences in Bilingual Corpora," 1993, Computational Linguisitcs, vol. 19, No. 1, pp. 75-102.
Papineni et al., "Bleu: a Method for Automatic Evaluation of Machine Translation", Proc. of the 40th Annual Meeting of the Association for Computational Linguistics (ACL), Jul. 2002.
Celine, Volume discounts on large translation project, naked translations, http://www.nakedtranslations.com/en/2007/volume-discounts-on-large-translation-projects/, Aug. 1, 2007, retrieved Jul. 16, 2012.
Papineni et al., "Bleu: a Method for Automatic Evaluation of Machine Translation", Proc. of the 40th Annual Meeting of the Association for Computational Linguistics (ACL), Jul. 2002, pp. 311-318.
Shaalan et al., "Machine Translation of English Noun Phrases into Arabic", (2004), vol. 17, No. 2, International Journal of Computer Processing of Oriental Languages, 14 pages.
Isahara et al., "Analysis, Generation and Semantic Representation in CONTRAST—A Context-Based Machine Translation System", 1995, Systems and Computers in Japan, vol. 26, No. 14, pp. 37-53.
Proz.com, Rates for proofreading versus Translating, http://www.proz.com/forum/business_issues/202-rates_for_proofreading_versus_translating.html, Apr. 23, 2009, retrieved Jul. 13, 2012.
Celine, Volume discounts on large translation project, naked translations, http://www.nakedtranslations.com/en/2007/volume-discounts-on-large-transl- ation-projects/, Aug. 1, 2007, retrieved Jul. 16, 2012.
Graehl, J and Knight, K, May 2004, Training Tree Transducers, In NAACL-HLT (2004), pp. 105-112.
Niessen et al, "Statistical machine translation with scarce resources using morphosyntactic information", Jun. 2004, Computational Linguistics, vol. 30, issue 2, pp. 181-204.
Liu et al., "Context Discovery Using Attenuated Bloom Filters in Ad-Hoc Networks," Springer, pp. 13-25, 2006.
First Office Action mailed Jun. 7, 2004 in Canadian Patent Application 2408819, filed May 11, 2001.
First Office Action mailed Jun. 14, 2007 in Canadian Patent Application 2475857, filed Mar. 11, 2003.
Office Action mailed Mar. 26, 2012 in German Patent Application 10392450.7, filed Mar. 28, 2003.
First Office Action mailed Nov. 5, 2008 in Canadian Patent Application 2408398, filed Mar. 27, 2003.
Second Office Action mailed Sep. 25, 2009 in Canadian Patent Application 2408398, filed Mar. 27, 2003.
First Office Action mailed Jan. 3, 2005 in European Patent Application No. 03716920.8, filed Mar. 27, 2003.
Second Office Action mailed Nov. 9, 2006 in European Patent Application No. 03716920.8, filed Mar. 27, 2003.
Third Office Action mailed Apr. 30, 2008 in European Patent Application No. 03716920.8, filed Mar. 27, 2003.
Office Action mailed Oct. 25, 2011 in Japanese Patent Application 2007-536911 filed Oct. 12, 2005.
Office Action mailed Jul. 24, 2012 in Japanese Patent Application 2007-536911 filed Oct. 12, 2005.
Final Office Action mailed Apr. 1, 2013 in Japanese Patent Application 2007-536911 filed Oct. 12, 2005.
Office Action mailed May 13, 2005 in Chinese Patent Application 1812317.1, filed May 11, 2001.
Office Action mailed Apr. 21, 2006 in Chinese Patent Application 1812317.1, filed May 11, 2001.
Office Action mailed Jul. 19, 2006 in Japanese Patent Application 2003-577155, filed Mar. 11, 2003.
Office Action mailed 2007 in Chinese Patent Application 3805749.2, filed Mar. 11, 2003.
Office Action mailed Feb. 27, 2007 in Japanese Patent Application 2002-590018, filed May 13, 2002.
Office Action mailed Jan. 26, 2007 in Chinese Patent Application 3807018.9, filed Mar. 27, 2003.
Office Action mailed Dec. 7, 2005 in Indian Patent Application 2283/DELNP/2004, filed Mar. 11, 2003.
Office Action mailed Mar. 31, 2009 in European Patent Application 3714080.3, filed Mar. 11, 2003.
Agichtein et al., "Snowball: Extracting Information from Large Plain-Text Collections," ACM DL '00, the Fifth Acm Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action mailed Aug. 29, 2006 in Japanese Patent Application 2003-581064, filed Mar. 27, 2003.
Office Action mailed Jan. 26, 2007 in Chinese Patent Application 3807027.8, filed Mar. 28, 2003.
Office Action mailed Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.
Huang et al. Automatic Extraction of Named Entity Translingual Equivalence Based on Multi-Feature Cost Minimization. In Proceedings of the ACL 2003 Workshop on Multilingual and Mixed-Language Name Entry Recognition.
Non-Final, May 9, 2013, U.S. Appl. No. 11/454,212, filed Jun. 15, 2006.
Final, May 7, 2013, U.S. Appl. No. 11/272,460, filed Nov. 9, 2005.
Non-Final, Oct. 3, 2012, U.S. Appl. No. 11/272,460, filed Nov. 9, 2005.
Non-Final, Nov. 8, 2006, U.S. Appl. No. 10/403,862, filed Mar. 28, 2003.

(56) References Cited

OTHER PUBLICATIONS

Allowance, May 15, 2013, U.S. Appl. No. 10/884,175, filed Jul. 2, 2004.
Allowance, Jul. 23, 2012, U.S. Appl. No. 11/087,376, filed Mar. 22, 2005.
Allowance, Jun. 12, 2012, U.S. Appl. No. 11/087,376, filed Mar. 22, 2005.
Final, Aug. 29, 2012, U.S. Appl. No. 11/250,151, filed Oct. 12, 2005.
Allowance, Oct. 25, 2012, U.S. Appl. No. 11/592,450, filed Nov. 2, 2006.
Non-final, Jul. 17, 2013, U.S. Appl. No. 11/640,157, filed Dec. 15, 2006.
Final, Dec. 4, 2012, U.S. Appl. No. 11/640,157, filed Dec. 15, 2006.
Allowance, Feb. 11, 2013, U.S. Appl. No. 11/698,501, filed Jan. 26, 2007.
Non-Final, Jul. 2, 2012, U.S. Appl. No. 12/077,005, filed Mar. 14, 2008.
Non-Final, Mar. 29, 2013, U.S. Appl. No. 12/077,005, filed Mar. 14, 2008.
Final, Jul. 16, 2013, U.S. Appl. No. 11/811,228, filed Jun. 8, 2007.
Non-Final, Feb. 20, 2013, U.S. Appl. No. 11/811,228, field Jun. 8, 2007.
Non-Final, Aug. 22, 2012, U.S. Appl. No. 12/510,913, file Jul. 28, 2009.
Final, Apr. 11, 2013, U.S. Appl. No. 12/510,913, filed Jul. 28, 2009.
Allowance, Oct. 9, 2012, U.S. Appl. No. 12/572,021, filed Oct. 1, 2009.
Non-Final, Jun. 19, 2012, U.S. Appl. No. 12/572,021, filed Oct. 1, 2009.
Non-Final, Jun. 27, 2012, U.S. Appl. No. 12/720,536, filed Mar. 9, 2010.
Advisory, Jun. 12, 2013, U.S. Appl. No. 12/720,536, filed Mar. 9, 2010.
Final, Apr. 24, 2013, U.S. Appl. No. 12/720,536, filed Mar. 9, 2010.
Final, Jun. 11, 2013, U.S. Appl. No. 12/820,061, filed Jun. 21, 2010.
Non-Final, Feb. 25, 2013, U.S. Appl. No. 12/820,061, filed Jun. 21, 2010.
Non-Final, Aug. 1, 2012, U.S. Appl. No. 13/089,202, filed Apr. 18, 2011.
Final, Apr. 8, 2013, U.S. Appl. No. 13/089,202, filed Apr. 18, 2011.
Notice of Allowance mailed Dec. 10, 2013 in Japanese Patent Application 2007-536911, filed Oct. 12, 2005.
Makoushina, J. "Translation Quality Assurance Tools: Current State and Future Approaches." Translating and the Computer, 29, 1-39, retrieved at <<http://www.palex.ru/fc/98/Translation%20Quality%Assurance%20Tools.pdf>>.
Specia et al. "Improving the Confidence of Machine Translation Quality Estimates," MT Summit XII, Ottawa, Canada, 2009, 8 pages.

* cited by examiner

CUSTOMIZABLE MACHINE TRANSLATION SERVICE

CROSS-REFERENCES

The present application is related to U.S. patent application Ser. No. 11/223,823 filed Sep. 9, 2005 and entitled "Adapter for Allowing Both Online and Offline Training of a Text to Text System"; U.S. patent application Ser. No. 10/143,382 filed May 9, 2002 and entitled "Statistical Memory-Based Translation System"; and U.S. patent application Ser. No. 11/635,248 filed Dec. 5, 2006 and entitled "Systems and Methods for Identifying Parallel Documents and Sentence Fragments in Multilingual Document Collections," all of which are herein incorporated by reference.

BACKGROUND

1. Field of Invention

The present invention relates generally to machine translation and more specifically to providing a customizable machine translation service.

2. Description of the Related Art

Machine translation techniques, including translation memories, statistical machine translation, linguistic models, and the like, typically require a training corpus or other pre-translated materials on which to base translations. This data set is typically very large and based on generic documents. Further, due to the size of the data set required, the translations typically reflect generic word usage or word usage in commonly-translated domains such as news, government documents, and the like.

Currently, online machine translation services are mostly generic (i.e., they are meant to translate texts in any given domain). For example, SDL, a provider of translation services, offers an online translation service at www.FreeTranslation.com. At this website, a user can enter an input text string in a source language and specify a target language. The translation service will translate the input text string into the specified target language and display an output string. However, this service and other similar services are not equipped to manage and exploit specialized translations.

Some translation memories are available online. For example, Wordfast provides a Very Large Translation Memory (VLTM) that can be accessed using a client. However, this project requires users to donate translation memories in order to expand. Further, domains are not separated from one another within the translation memory. Lingotek offers an online language search engine onto which users may upload translated content and later search for segments of the translated content.

Specialized translations typically include translations of documents generated by a niche or specialty. Technical documents generated within a niche often require specialized translations that require a translation engine to be trained on a specialized training set. For example, an automotive manufacturer may require translations of documents that use otherwise generic words in an atypical manner. An information technology supplier may use the same words in yet another manner. As such, there is a need for a translation service capable of being tuned/trained to a specialty/niche and equipped to manage and exploit specialized translations.

SUMMARY

A system and method for providing a translation service is provided. The exemplary method comprises providing a translation interface accessible via a network such as the Internet. The translation interface receives specialized data associated with a domain from a member. On the basis of this data, a domain-based translation engine or translation memory is made available. A text string written in a source language is received from the member via the translation interface. A previously developed domain-based translation engine is selected. In exemplary embodiments, the domain-based translation engine may be associated with a source language, a target language, and a domain. The text string may be translated into the target language using, at least in part, the selected domain-based translation engine. The translated text string may then be transmitted to the member via the Internet.

DETAILED DESCRIPTION

A service for providing specialized translations enables members associated with a specialized niche to use previously translated documents without having to purchase and install a translation engine on a local server. A translation engine is configured to translate an input text string written in a source language into a target language. In some embodiments, the translation engine may perform statistical machine translation (SMT) or another data-driven machine translation. Data-driven machine translations may include translation memory, heuristics-based, context-based, linguistics-based, a hybrid translation technique, or the like. The member may provide any amount of specialized data associated with a domain and/or language pair. The specialized data may be used as a translation memory or as training data in a data-driven machine translation engine. The member may select a translation engine and/or translation memory that the specialized translation service uses to translate an input string.

If the specialized translation service is based on a small amount of specialized data, the data may be used to generate a translation memory that can be accessed by the translation engine. In some embodiments, the translation memory may be returned to the user. If there is a large amount of specialized data, a customized translation engine may be generated. In some embodiments, the customized translation engine may be a data-driven translation engine trained on both a generic data set and the specialized data.

Figure 1:
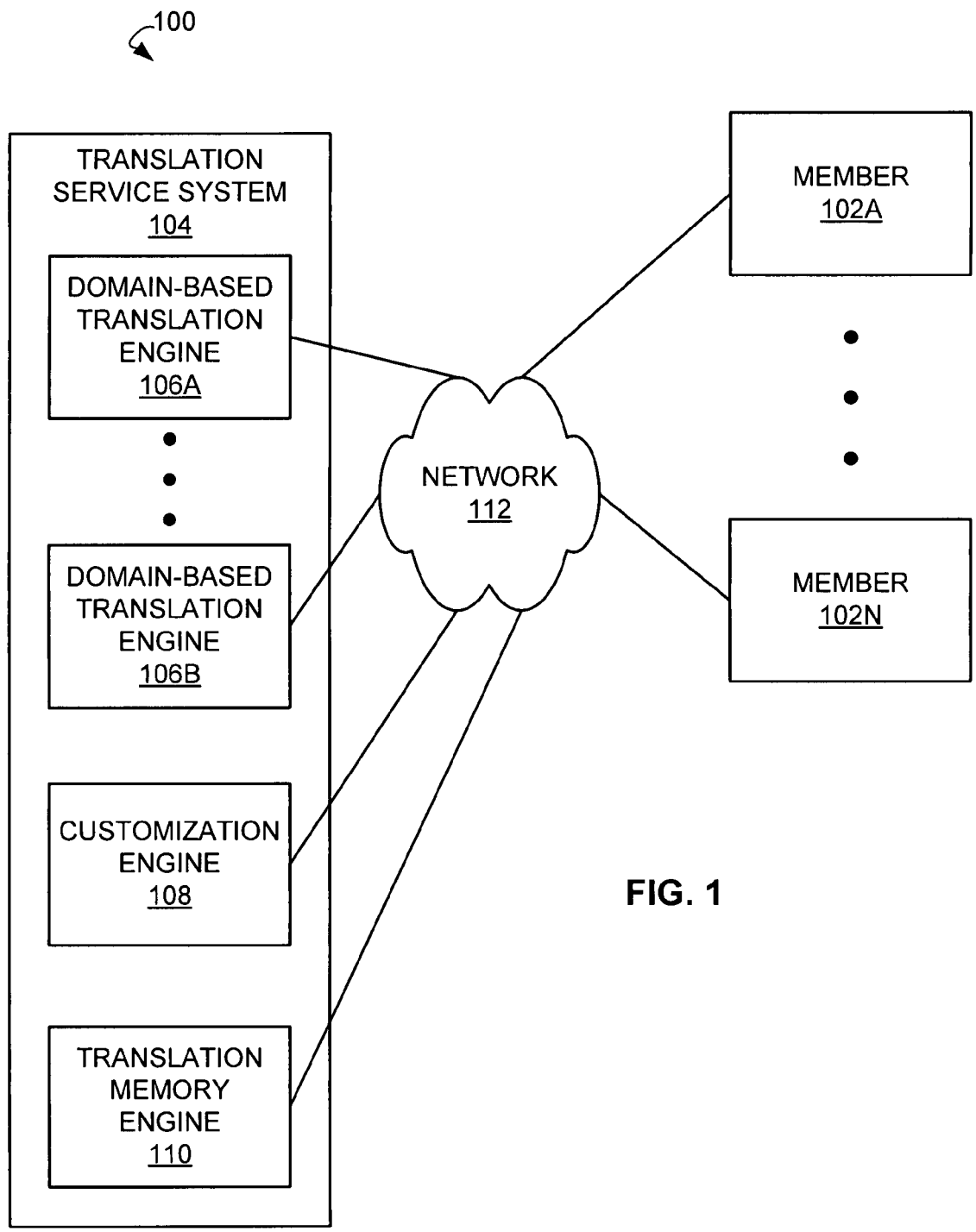
FIG. 1 depicts a networked environment in which various embodiments may be practiced.

FIG. 1 depicts a networked environment 100 in which various embodiments of the present invention may be practiced. The environment 100 comprises a plurality of members 102A through 102N, and a translation service system 104 which comprises a plurality of domain-based translation engines 106A and 106B, a customization engine 108, and/or a translation memory engine 110 communicatively coupled via a network 112. The network 112 may comprise a private network and/or a public network. In some embodiments, the network 112 comprises the Internet. Any number of members 102 may be present in the environment 100.

The members 102A through 102N provide specialized data and/or input strings to be translated. For example, member 102A may be an automotive manufacturer while member 102N may be an information technology supplier. In exemplary embodiments, the member 102A may provide repair manuals that are previously translated into one or more target languages as specialized data. The member 102N may, however, provide no specialized data. Any member 102A through 102N may provide an input text string to one of the domain-based translation engines 106. In some embodiments, the member 102A may select multiple domain-based translation engines 106 if a plurality of domain-based translation engines 106 is available.

The translation service system 104 may comprise the plurality of domain-based translation engines 106, the customization engine 108, and/or the translation memory engine 110. The translation service system 104 may provide an online translation service, generate a customized domain-based translation engine, and/or generate a translation memory. The translation service system 104 may comprise one or more servers or other computing devices configured to communicate over the network 112 via a communications interface. The server(s) may comprise a processor configured to execute programs stored in a memory.

In some embodiments, member 102 may select whether to generate a translation memory and/or a domain-based translation engine using specialized data. If generating a translation memory is selected, the member 102 may receive the translation memory from the translation memory engine 110 and store the translation memory. The member may additionally transmit to or select a translation memory from the translation service system 104 from which a domain-based translation engine may be generated.

The translation service system 104 may provide a translation interface via, for example, a website. The translation interface may be configured to receive specialized data from the members 102A through 102N. Based on the amount of specialized data received and the instructions received from the member, the translation service system 104 may determine whether to generate a translation memory using the translation memory engine 110 and/or use the customization engine 108 to create a domain or member-specific translation engine, such as domain-based translation engine 106A.

In some embodiments of the present invention, the translation service system 104 may comprise an accounting engine (not shown). The accounting engine may calculate credits and/or debits based on the activities of members 102A through 102N. The member 102A may be associated with an account having a number of credits or debits based on usage. The debits may be charged in any way including pay-per-use, subscription, packages, and the like. For example, the member 102A may purchase a subscription for access to one or more domain-based translation engines 106. In another embodiment, the member 102A may pay a fee for services requested. Any combination and/or variation of billing may be used.

Various embodiments of the translation service system 104 may grant a credit to the member 102A. For example, if the member 102A provides specialized data that is accessed to translate an input string received from member 102N, the member 102A may receive a credit for future translations and/or currency. The specialized data may be associated with a translation memory and/or a domain-based translation engine 106 as discussed further herein.

The domain-based translation engine 106A comprises a translation engine that may be selected by the member 102A. The domain-based translation engine 106A may be associated with a language pair and/or a domain. A language pair is a pairing of two languages one of which is a source language and the other of which is a target language. In some embodiments, the language pair is bi-directional such that the source language may become the target language and vice versa. The domain is any specialty or niche that has some jargon or specialized usage of words. Domains may include, for example, information technology, automotive, literature, medicine, law, or the like. Additionally domains may be of any scope. For example, a domain may relate specifically to a product, such as a video game system or console. The domain-based translation engine 106A is configured to translate an input string associated with the domain from a source language into a target language. As such, the language pair may comprise any source language and any target language. The domain-based translation engine 106A may use no specialized data, or any amount of specialized data. The specialized data may also be used by the translation memory engine 110 to generate a translation memory that can be accessed by the domain-based translation engine 106A. The environment 100 may comprise a plurality of domain-based translation engines 106A and 106B.

The customization engine 108 is configured to process a large amount of specialized data to generate a domain-based translation engine 106 or a translation memory associated with the member 102A or a domain. In some embodiments, the customization engine 108 may generate a set of domain-specific parameters and merge the generated set of domain-specific parameters with a generic set of parameters. The customization engine 108 may, for example, receive a large amount of translated repair manuals from an automotive manufacturer. The translated auto repair manuals may be used to then generate a domain-based translation engine 106A specific to the automotive manufacturer and/or automotive repair manuals.

The translation memory engine 110 may generate a translation memory based on the specialized data. In some embodiments, the translation memory may be used to train a domain-based translation engine 106A. The translation memory may also be accessed by the domain-based translation engine 106A during translation or accessed by the customization engine 108 to train the domain-based translation engine 106A. In some embodiments, the translation memory may be stored at the member 102.

Figure 2:
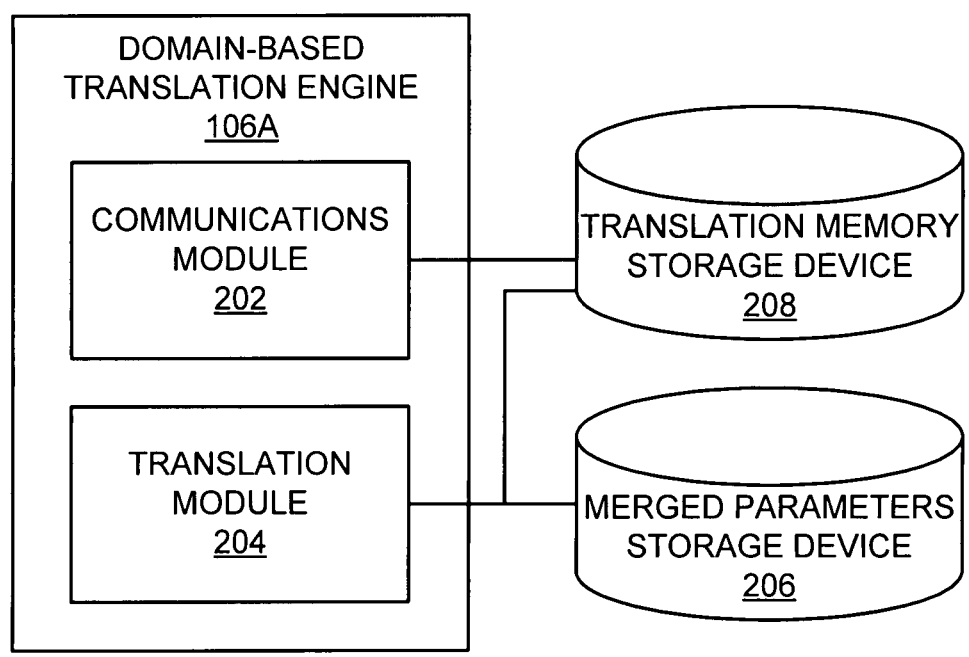
FIG. 2 is a block diagram of a domain-based translation engine according to an embodiment of the present invention.

FIG. 2 is a block diagram of a domain-based translation engine 106A according to an embodiment of the present invention. The domain-based translation engine 106A may comprise a communications module 202 and a translation module 204. The domain-based translation engine 106A may access stored merged parameters in a merged parameters storage device 206 and/or optional translation memory storage device 208. The domain-based translation engine 106A may be associated with a language pair (e.g., English-Chinese) and a domain (e.g., automotive). In some embodiments, the domain-based translation engine 106A is configured to perform bi-directional translations.

The communications module 202 is configured to receive specialized data and/or input text strings from the member 102A. The communications module 202 may process or re-format the specialized data. If the communications module 202 receives an input text string, the communications module 202 may transmit the input text string to the translation module 204.

The translation module 204 is configured to translate the input text string from the source language to the target language. The translation module 204 may be configured to translate the input text string using a variety of data-driven machine translation techniques including heuristics-based, context-based, translation memory-based, linguistic-based, statistics-based, or any combination of these techniques. In the embodiment shown, the translation module 204 is configured to access a set of merged parameters stored in the merged parameters storage device 206 associated with a statistical machine translation system and the translation memory storage device 208. The translation memory may be based on specialized data received from the member 102A. The domain-based translation engine 106 may comprise fewer or additional modules or components according to various embodiments including modules for performing other types of data-driven machine translations.

The merged parameters storage device 206 stores merged parameters that comprise information derived from a set of generic training data and specialized data associated with the domain. The generic training data may be derived from parallel or comparable bilingual data such as translation memories, probabilistic and non-probabilistic word-based and phrase-based dictionaries, glossaries, Internet information, parallel corpora in multiple languages, comparable corpora in multiple languages, and human-created translations. The generic training data may be related to any domain and may comprise millions of sentences. The specialized data is derived from parallel or comparable bilingual data relating to the domain associated with the domain-based translation engine 106. The specialized data and the generic training data may be merged according to the system and method described in U.S. patent application Ser. No. 11/223,823 filed Sep. 9, 2005 and entitled "Adapter for Allowing Both Online and Offline Training of a Text to Text System."

The translation memory storage device 208 may comprise generic and/or data relating to the domain. The translation memory storage device 208 may further comprise specialized data received from the member 102A. In exemplary embodiments, the translation memory may be used by a statistical machine translation system as described in U.S. patent application Ser. No. 10/143,382 filed May 9, 2002 and entitled "Statistical Memory-Based Translation System." While a hybrid statistical machine translation/translation memory translation engine is described herein, other data-driven machine translation techniques may be performed by the domain-based translation engine to generate a translation as is known in the art.

Figure 3:
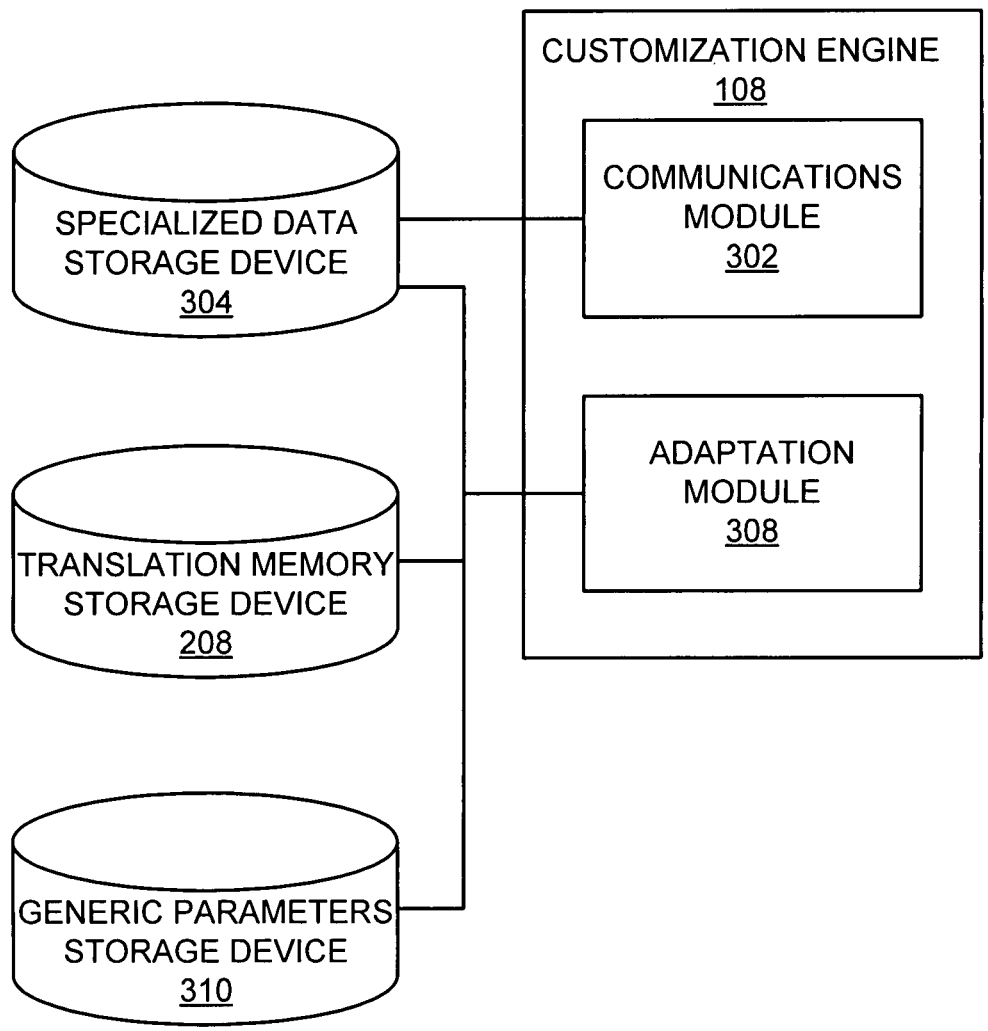
FIG. 3 is a block diagram of a customization engine according to an embodiment of the present invention.

FIG. 3 is a block diagram of the customization engine 108 according to an embodiment. The customization engine is configured to generate a domain-based translation engine 106 based on specialized data. In some embodiments, the customization engine 108 may be combined with the domain-based translation engine 106.

A communications module 302 is configured to receive and transmit data via the network 112. The communications module 302 may receive specialized data from members 102A through 102N, domain-based translation engines 106, or other sources connected to the network 112. The communications module 302 may format and/or process the specialized data to generate domain parameters that can be processed by an adaptation module 308.

In exemplary embodiments, a specialized data storage device 304 may store specialized data comprising millions of words. The source of these words may be specialized data received from the members 102, data derived from other members, data derived from public sources, or any combination of sources. The specialized data storage device 304 may store specialized data as raw data, aligned words or segments, statistical machine translation parameters, a translation memory, or in any other format.

In exemplary embodiments, the adaptation module 308 is configured to generate a domain-based translation engine 106A based on the specialized data stored in the specialized data storage device 304, the translation memory storage device 208, and/or a set of stored generic parameters stored in a generic parameters storage device 310. In some embodiments, the adaptation module 308 may comprise an adapter as described in U.S. patent application Ser. No. 11/223,823 filed Sep. 9, 2005 and entitled "Adapter for Allowing Both Online and Offline Training of a Text to Text System" for statistical machine translation. In other embodiments, the adaptation module 308 may generate a domain-based translation engine 106A using other techniques including, but not limited to, translation memory, heuristics-based, context-based, linguistics-based, or any hybrid translation technique.

The generic parameters stored in the generic parameters storage device 310 may be derived from a large bilingual corpus comprising approximately hundreds of millions of words according to one embodiment. In the depicted embodiment, the generic parameters stored in the generic parameters storage device 310 are shown as part of a statistical machine translation system. In other embodiments, however, the generic parameters may comprise a translation memory, a set of heuristics, linguistic-based and/or context-based data, or the like. The generic parameters may comprise any combination of the above.

Figure 4:
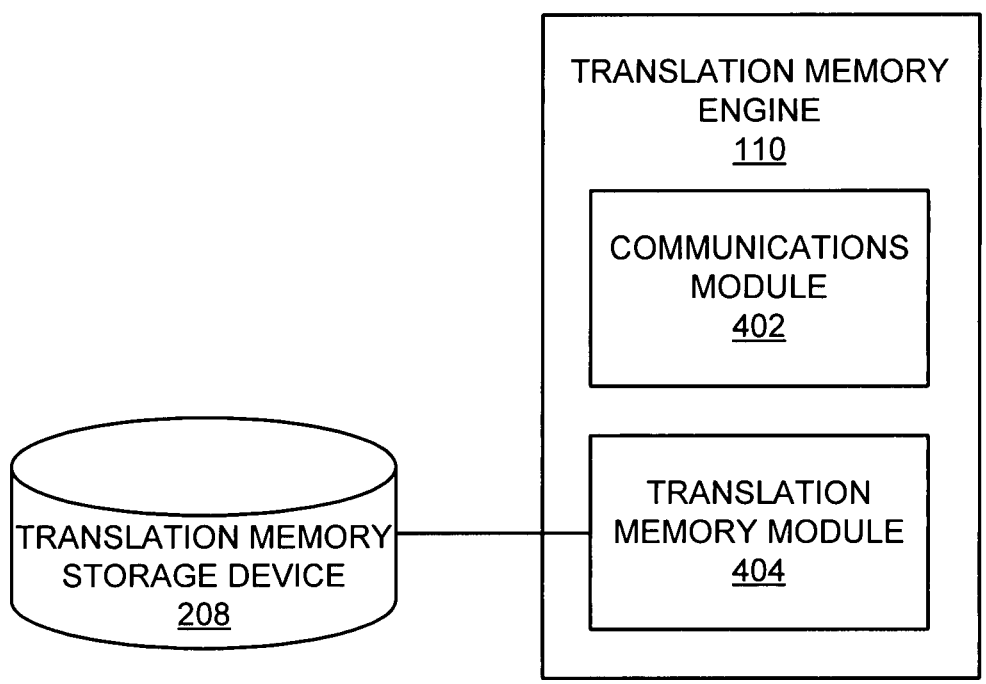
FIG. 4 is a block diagram of a translation memory engine according to an embodiment of the present invention.

FIG. 4 is a block diagram of the translation memory engine 110 according to an embodiment. The translation memory engine 110 is configured to generate a translation memory based on specialized data.

A communications module 402 is configured to receive and transmit data via the network 112. The communications module 302 may receive specialized data from members 102A through 102N, domain-based translation engines 106, or other sources connected to the network 112. The communications module 402 may format the specialized data.

In some embodiments, the translation memory engine 110 may comprise a translation memory module 404. The translation memory module 404 is configured to generate parallel data from a collection of documents. In exemplary embodiments, the documents may be stored in a variety of file formats and/or contain formatting.

The translation memory module 404 may find parallel or comparable documents in a collection according to the systems and methods described in U.S. patent application Ser. No. 11/635,248 filed Dec. 5, 2006 and entitled, "Systems and Methods for Identifying Parallel Documents and Sentence Fragments in Multilingual Document Collections," which is incorporated herein by reference. Next, the translation memory module 404 may align the sentences of the parallel documents using prior art sentence alignment methods to generate a translation memory. The translation memories may be stored in a translation memory storage device 208. In some embodiments, the translation memory storage device 208 may be located at the member 102A.

Figure 5:
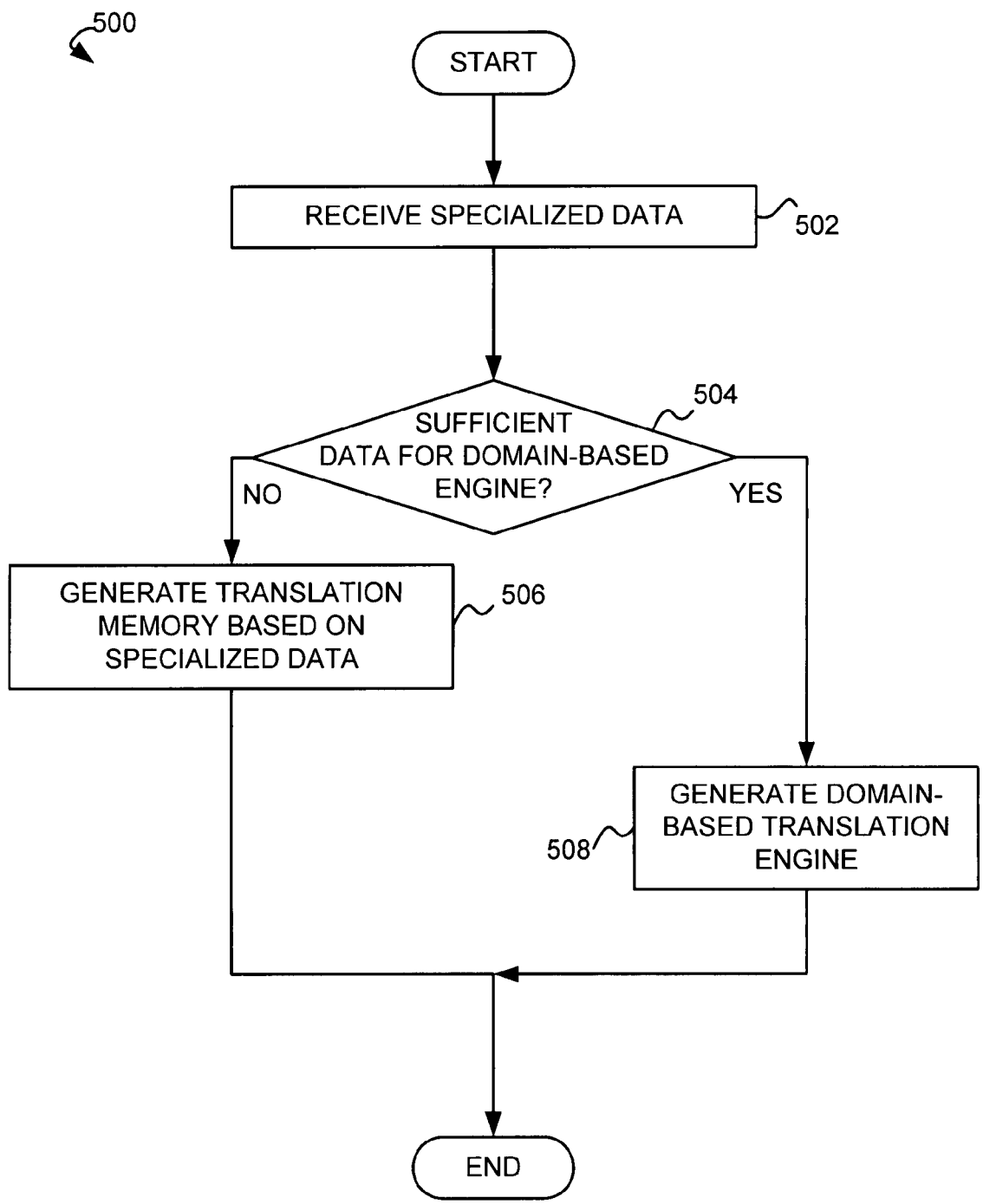
FIG. 5 is a flowchart of an exemplary process for generating a translation engine.

FIG. 5 is a flowchart of process 500 for generating a domain-based translation engine 106A or a translation memory storage device 208 according to an embodiment of the present invention. The process 500 may be performed by the translation service system 104.

In step 502, specialized data is received by, for example, the translation service system 104. The received data may comprise specialized data received from a member, specialized data retrieved from public sources, or the like. The specialized data may be associated with a domain, a source language, and a target language. The specialized data may comprise parallel or comparable documents, an aligned bilingual corpus, a translation memory, a bilingual terminology list, a translation dictionary, a set of statistical machine translation parameters, or the like.

In some embodiments, the specialized data may be associated with the member 102A for the purpose of maintaining confidentiality of the data and/or managing credits to the member 102A for allowing the specialized data to be used by other domain-based translation engines. The member 102A may, for example, indicate that at least a portion of the specialized data requires a high level of confidentiality. This specialized data may then be used for translation memories and/or generating statistical machine parameters that only the member 102A may access. The member 102A may, alternatively or additionally, elect to share another portion of the specialized data. When this shared specialized data is used by the domain-based translation engine to translate an input string received from another member, the member 102A may receive a credit.

In step 504, a determination is made as to whether the member 102A requires the development of a domain-based engine and whether there is a sufficient amount of specialized data to generate a domain-based engine, such as the domain based translation engine 106A, by, for example, the adaptation module 308. To generate a domain-based translation engine, more than 50,000 words of parallel data may be required. The domain-based translation engine may be based on the data or a translation memory associated with a single member 102A. In some embodiments, the single member 102A may be associated with multiple sets of specialized data that may each be associated with a separate domain-based translation engine.

If there is insufficient data to generate a domain-based translation engine, a translation memory, such as the translation memory stored in the translation memory storage device 208, may be generated and/or updated based on the specialized data in step 506. The translation memory may be used along with merged parameters by a domain-based translation engine to translate input text strings as discussed, at least, in connection with FIG. 2. If there is sufficient data to generate a domain-based translation engine and the member 102A requires so, a domain-based translation engine is generated in step 508.

Figure 6:
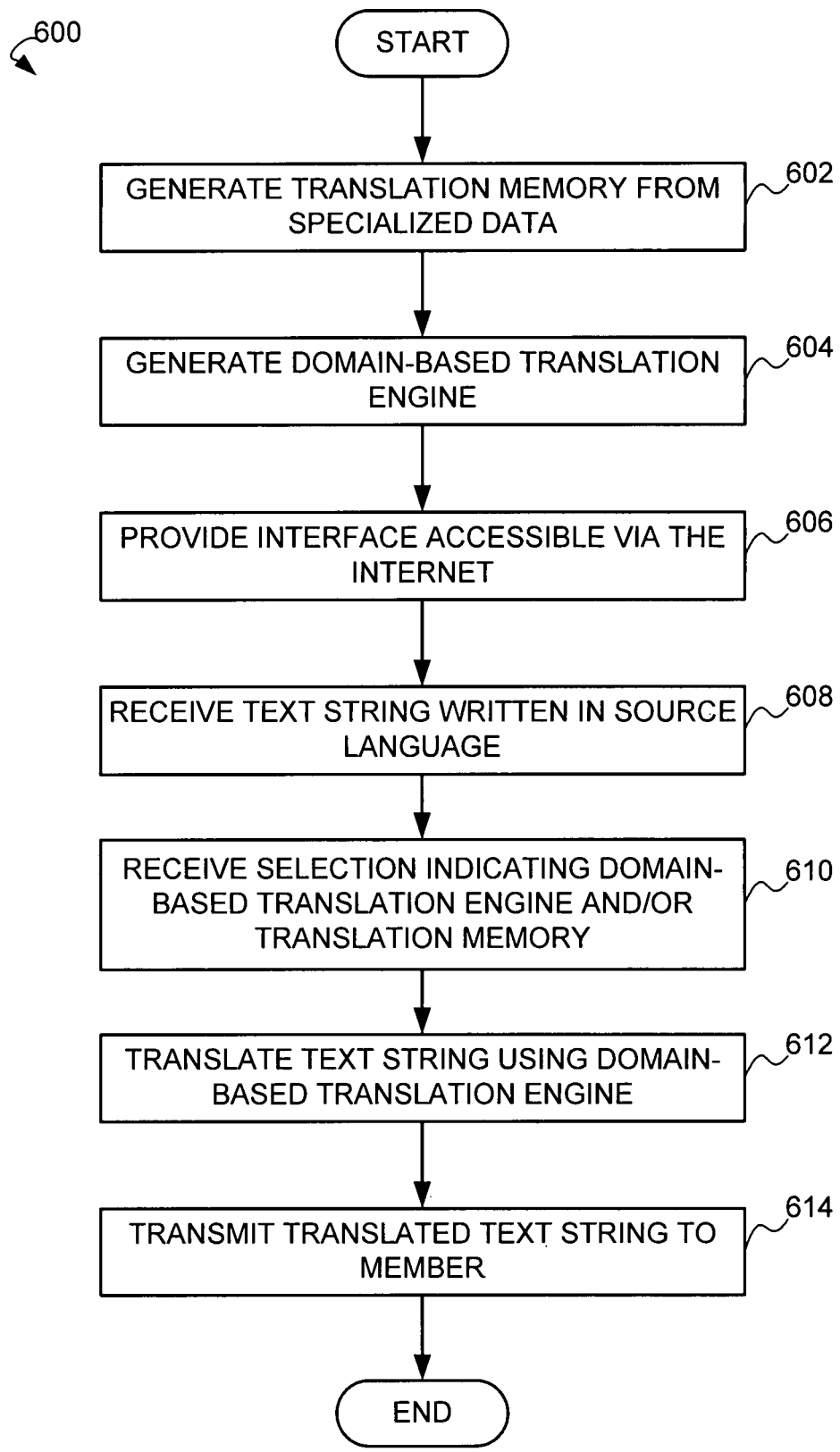
FIG. 6 is a flowchart of an exemplary process for providing a translation service.

FIG. 6 is a flowchart of a process 600 for providing a translation service according to an embodiment of the present invention. The translation service may be free, subscription-based, usage fee-based, or any other fee-based scheme. In step 602, the translation memory may be generated based on specialized data and stored in the translation memory storage device 208. The translation memory engine 110 may generate the translation memory. Alternatively or additionally, in step 604, the domain-based translation engine may be generated. The domain-based translation engine may be generated according to the process 500 and may comprise the domain-based translation engine 106A. In some embodiments, the customization engine 108 may generate the domain-based translation engine. The domain-based translation engine may comprise, or have access to, the translation memory.

In step 606, an interface accessible via the Internet is provided. In step 608, a text string written in a source language is received. The text string may be of any length. In some embodiments, the text string is associated with a file format and/or comprises formatting that may be preserved when the text string is translated. In step 610, a selection indicating the domain-based translation engine and/or the translation memory is received. The selection may comprise a source language, a target language, and/or a domain. The selection may also comprise a sub-domain or member-specific domain.

A member-specific domain comprises a domain-based translation engine or translation memory generated using specialized data received from a specific member, referred to as an originating member. In exemplary embodiments, the member-specific domain may be accessed only by the originating member. In some embodiments, the originating member may identify other members 102 who are able to access the member-specific domain. In other embodiments, the member-specific domain may be open to any other member 102. In the embodiments where the member-specific domain is available to other members 102, the originating member may receive a credit if another member 102 selects the member-specific domain to translate an input text string. The credit may comprise points redeemable for additional translations, cash, or any other form of compensation.

In step 612, the text string is translated using the domain-based translation engine 106A. The domain-based translation engine 106A may use one or more techniques to translate the text string as discussed herein. In some embodiments, the translation service system 104 may indicate, through the use of annotations, highlighting, or other formatting, which technique is used. In some embodiments, the indication may represent a confidence level that the translation is accurate. This confidence level information may indicate a probability that the translation is correct. For example, a translated phrase within the text string that was translated using a translation memory is likely to be 100% correct while a translation based on the merged parameters is less likely to be correct. Thus, the translated text may be annotated to indicate the portions translated using the translation memory and the merged parameters, respectively. In other embodiments, the confidence level information may be calculated using other techniques known to those skilled in the art.

In step 614, the translated text string is transmitted to the member 102. The translated text string may comprise confidence level information, a timestamp, a domain-based translation engine identifier, or the like. The translated text string may be associated with a same or a different file format than that associated with the text string. In some embodiments, formatting within the text string may be included in the translated text string.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with various embodiments. Those skilled in the art are familiar with instructions, processor(s), and storage medium.

While various embodiments have been described above, it should be understood that they have been presented by way of example only, and not limitation. The scope of the present disclosure is in no way limited to the languages used to describe exemplary embodiments. Thus, the breadth and scope of a preferred embodiment should not be limited by any of the above-described exemplary embodiments

What is claimed is:

1. A method for providing a translation service comprising:
   receiving a text string written in a source language from a member via a translation interface;
   receiving specialized data associated with:

a domain from the member via the translation interface, and an indication of confidentiality;

generating a translation memory using the received specialized data;

generating a set of domain-specific parameters for statistical machine translation using the received specialized data;

merging the generated set of domain-specific parameters with a generic set of statistical machine translation parameters;

generating a domain-based translation engine based on the received specialized data and generic data, the domain-based translation engine associated with a source language, a target language, and the domain;

training the domain-based translation engine using the translation memory;

receiving a selection of the generated domain-based translation engine from a plurality of domain-based translation engines, the selection received from the member via the translation interface;

translating the text string into the target language using, at least in part, the selected domain-based translation engine, the merged parameters and translation memory being used by the domain-based translation engine for translating the text string; and transmitting the translated text string to the member via the translation interface over a network.

2. The method of claim 1, wherein the translation interface is accessible via the network, the translation interface configured to receive translation memory associated with the domain from another member.

3. The method of claim 1, further comprising sending the generated translation memory to the member for storage.

4. The method of claim 1, further comprising:

translating a first portion of the text string using the translation memory;

annotating the translation of the first portion of the text string with a first confidence level;

translating a second portion of the text string using the merged parameters; and annotating the translation of the second portion of the text string with a second confidence level.

5. The method of claim 1, further comprising:

determining if the specialized data includes a sufficient amount of data for generating a domain-based translation engine; and generating the domain-based translation engine based on the determination that the specialized data includes a sufficient amount of data and a requirement received from the member to generate the domain-based translation engine using the specialized data.

6. The method of claim 1, further comprising:

translating a second text string received from a second member using, at least in part, specialized data received from the second member; and crediting an account associated with the second member.

7. The method of claim 1, further comprising receiving a payment from the member based on a subscription.

8. The method of claim 1, further comprising receiving a payment from the member based on a usage fee.

9. The method of claim 1, further comprising providing to the member confidence level information based on the merged parameters and associated with the translated text string.

10. The method of claim 1, wherein translating the text string is performed using, at least in part, a data-driven machine translation technique.

11. A domain-based translation engine comprising:

a communications module configured to receive specialized data and to receive a source language text string written in a source language and to receive a target language text string written in a target language, from a member via a network;

a translation module configured to translate the source language text string into the target language and to translate the target language text string into the source language using, at least in part, data-driven machine translation and the specialized data, wherein the domain-based translation engine is generated based on received domain data; and a customization engine configured to determine whether an amount of the specialized data is sufficient to generate the domain-based translation engine and generate a language memory using the specialized data if the amount of the specialized data is not sufficient or to generate the domain-based translation engine if the amount of the specialized data is sufficient.

12. The domain-based translation engine of claim 11, wherein the translation module is communicatively coupled with a translation memory engine configured to generate translation memory used for training the domain-based translation engine and accessed by the domain-based translation engine to translate the input text string.

13. A computer readable non-transitory medium having embodied thereon a program, the program being executable by a processor for performing a method for providing a translation service, the method comprising:

receiving a text string written in a source language from a member via a translation interface;

receiving translation memory from the member, the translation memory associated with the source language, a target language, and a domain;

receiving specialized data associated with the domain, the source language, and the target language, the specialized data including a set of domain-based statistical machine translation parameters;

merging the domain-based statistical machine translation parameters and a set of generic statistical machine translation parameters;

determining if the specialized data includes a sufficient amount of data for generating a domain-based translation engine;

receiving instructions from the member to generate the domain-based translation engine using the translation memory;

generating the domain-based translation engine based on the determination that the specialized data includes a sufficient amount of data and a requirement received from the member to generate the domain-based translation engine using the specialized data;

training the generated domain-based translation engine using both the translation memory and the specialized data;

receiving a selection of the domain-based translation engine from the member;

translating the text string into the target language using, at least in part, the selected domain-based translation engine, the received translation memory and the merged translation parameters accessed by the domain-based translation engine for translating the text string; and transmitting the translated text string to the member via the translation interface over an Internet.

14. The computer readable medium of claim 13, wherein the method further comprises:
receiving specialized data associated with a domain from another member; and
training the domain-based translation engine using the specialized data associated with the domain from another member and generic data.

15. The computer readable medium of claim 13, wherein the method further comprises translating at least a portion of the text string using the received translation memory and another portion of the text string using the merged parameters.

16. The computer readable medium of claim 13, wherein the method further comprises generating the domain-based translation engine using a customization engine based on the translation memory received from the member.

17. The computer readable medium of claim 13, wherein the method further comprises:
translating a second text string received from a second member from the target language to the source language using, at least in part, the domain-based translation engine; and
crediting an account associated with the member.

18. The computer readable medium of claim 13, wherein the method further comprises providing confidence level information associated with the parameters used for translating the text string.

19. The computer readable medium of claim 13, wherein specialized data is associated with an indication of confidentiality.

20. A method comprising:
receiving a plurality of documents from a member, a first document of the plurality of documents written in a first source language and a second document of the plurality of documents written in a second source language;
receiving instructions from the member including instructions to use a first domain-based translation engine for translating the first document and instructions to use a second domain-based translation engine for translating the second document;
receiving a set of domain-based statistical machine translation parameters;
merging the domain-based statistical machine translation parameters and a set of generic statistical machine translation parameters;
generating a first translation memory based on the first domain-based translation engine;
sending the first translation memory to the member for storage;
translating a first portion of the first document using the first translation memory based on the first domain-based translation engine and generic data;
annotating the translation of the first portion of the first document with a first confidence level;
translating a second portion of the first document using the merged parameters;
annotating the translation of the second portion of the first document with a second confidence level; and
generating a translation of the second document based on the second domain-based translation engine and generic data.

21. The method of claim 20, further comprising generating the second domain-based translation engine based on a second translation memory and the plurality of documents.

22. The method of claim 21, further comprising translating a text string received from another member using the second domain-based translation engine.

23. The method of claim 20, wherein the first document is associated with a first format and the second document is associated with a second format.

* * * * *